United States Patent Office 2,762,425
Patented Sept. 11, 1956

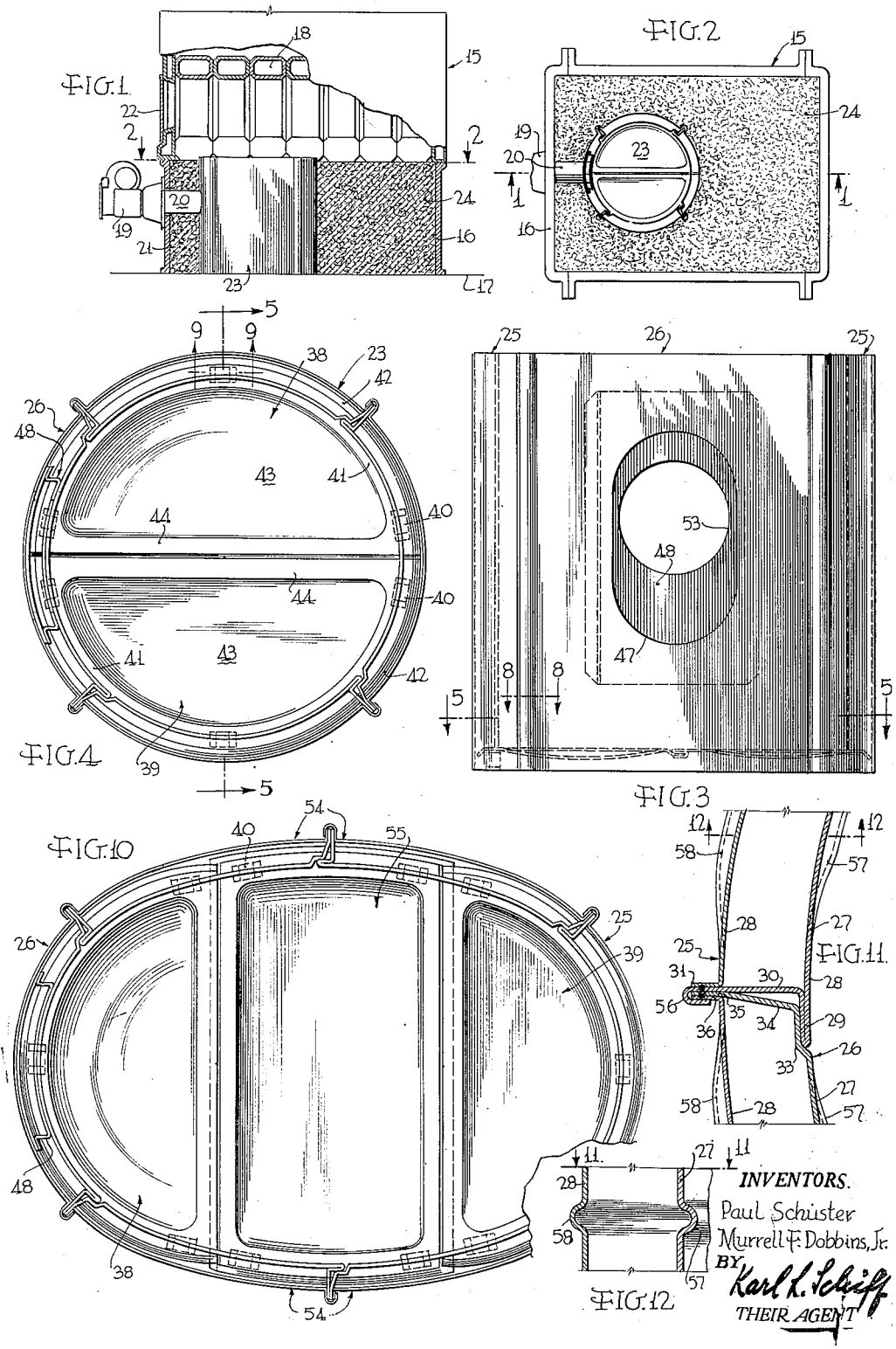

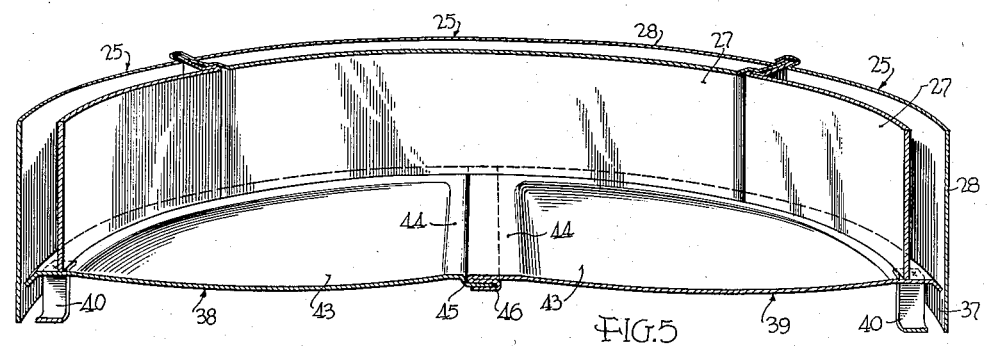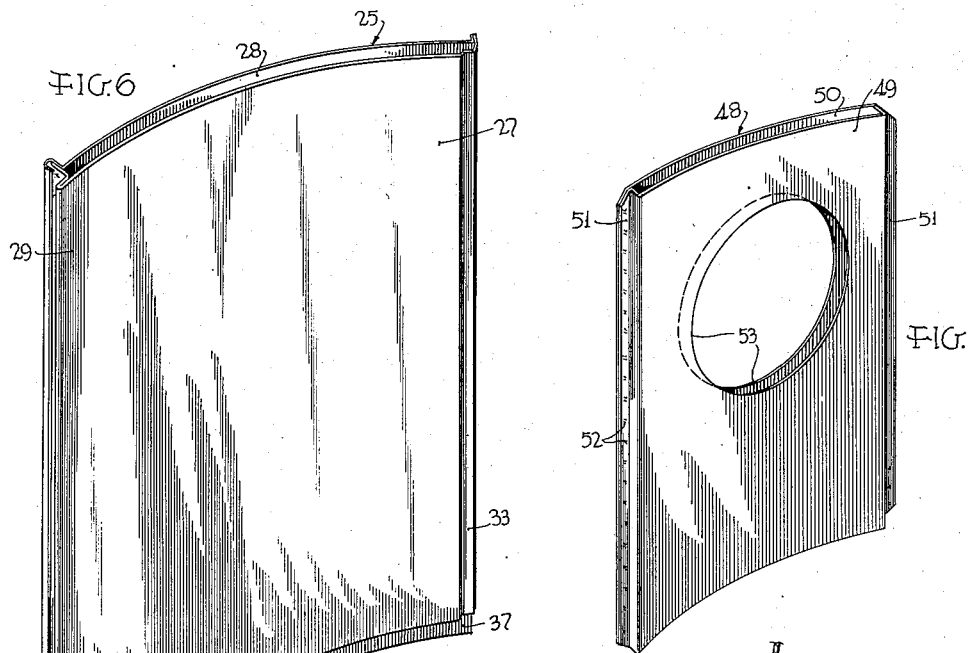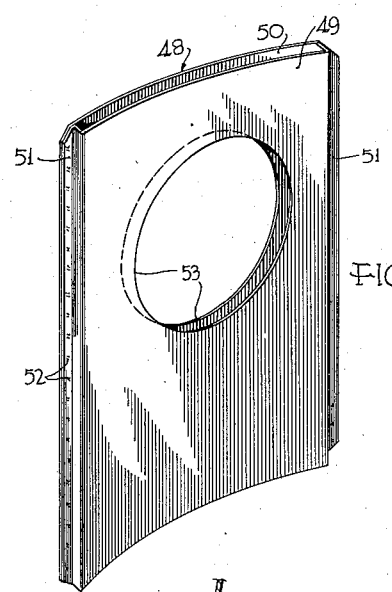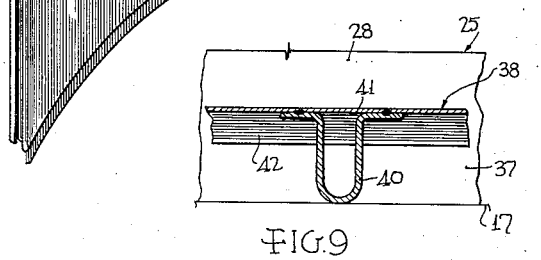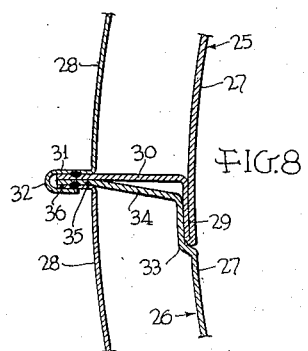

2,762,425

METAL COMBUSTION CHAMBER AND FURNACE WITH SUCH CHAMBER

Paul Schuster, Jenkintown, and Murrell F. Dobbins, Jr., Glenside, Pa., assignors to Custom Metal Products, Inc., Philadelphia, Pa., a corporation of Pennsylvania Application April 23, 1949, Serial No. 89,254

9 Claims. (Cl. 158—1)

The invention relates to a metal, preferably sheet metal, combustion chamber for domestic and other furnaces with gun-type oil burner, and to furnaces equipped with such chamber. More specifically, the invention relates to a sheet metal combustion chamber having inner and outer upright walls which are spaced from each other.

The new combustion chamber is composed of a plurality of sections or units, each of which includes a part of the outer and the inner wall, the two walls of each unit being permanently connected with each other along their opposite margins and the units being provided with means designed for the easy connection of the units with and disconnection from each other. The new combustion chamber includes, furthermore, a sheet metal bottom or end closure composed of several units or sections provided with means for connecting the units with each other.

The new combustion chamber as briefly described above combines the efficiency, in regard to fuel consumption and complete combustion, which is characteristic of double-walled sheet metal combustion chambers, with the advantage that it may easily be installed in new or old furnaces by introducing the sections singly through one of the furnace openings and assembling them in the interior of the furnace.

A further feature of the invention is the insulation of the outer wall of a double-walled combustion chamber, preferably by loose insulating material, such as mica pellets, filled between the outer wall of the combustion chamber and the furnace wall, while the space between the two walls of the chamber is left open and, at least at the upper end, in communication with the interior of the furnace. The insulation not only prevents waste of heat in furnaces having a mere supporting base without heat transfer means, but it also insures that the inner wall will quickly attain and then be kept at the high temperature which is an important factor for high efficiency. The open space between the two sheets leads to effective heat transfer to the desired parts of the furnace.

The new chamber, preferably, has at least its inner wall made of one of the known non-scaling metal alloys which are resistant to the high temperatures and the chemical attack of the flame, the fuel and the latter's combustion products. The outer wall may be made of the same or a similar type of material, though it need not have the same high heat and corrosion resistance because it is not directly exposed to the flame and practically not at all exposed to the fuel and the combustion gases.

Further features of the invention consist in means and arrangements for interconnecting the walls of each unit and for connecting the units to each other, in means allowing the easy adjustment of a combustion chamber to different diameters and heights of the tubular barrel of oil burners, and in designs permitting the formation of diffferent shapes and sizes of combustion chambers incorporating at least some standard wall units.

The above outlined and further objects, advantages and features of the invention will be more fully understood from or are disclosed for the first time in the attached drawing and the following description.

The drawing illustrates, by way of examples, several preferred embodiments of the invention.

In the drawing:

Figure 1 is a fragmentary diagrammatic side elevation, and a partial section along line 1—1 of Figure 2, of a furnace equipped with one form of the new combustion chamber;

Figure 2 is a plan view along line 2—2 of Figure 1 of the base of the furnace and of the combustion chamber;

Figure 3 is a front elevation, on a larger scale, of the combustion chamber shown in Figures 1 and 2;

Figure 4 is a plan view of the chamber shown in Figure 3 but turned 90° about its vertical axis;

Figure 5 is a fragmentary, partly sectional perspective view, on a still larger scale, the sections being taken substantially in the planes of lines 5—5 of Figures 3 and 4;

Figure 6 is a perspective view on about the scale of Figure 5 of one of the wall sections, sectors or units, several of which form the tubular portion of the combustion chamber;

Figure 7 is a perspective view on about the scale of Figure 6, of a slide to be fitted into one wall unit and over the burner barrel;

Figure 8 is a fragmentary section along line 8—8 of but on a larger scale than Figure 3, showing the formation of the interconnected margins of two adjoining wall units;

Figure 9 is a fragmentary section along line 9—9 of Figure 4 through the bottom plate, and a fragmentary inside elevation of the adjoining wall portions;

Figure 10 is a plan view, similar to Figure 4, showing a combustion chamber of different form and size;

Figure 11 is a fragmentary horizontal section (similar to Figure 8) along line 11—11 of Figure 12 through a modified construction of the inner and outer walls and of the joint between adjacent wall units; and Figure 12 is a fragmentary vertical section along line 12—12 of Figure 11.

The furnace 15 diagrammatically shown in Figures 1 and 2 has a so-called "dry" base 16, that is a base not formed as part of the jacket for the water or air to be heated. The base is mounted on the floor 17 and carries a sectional water jacket 18.

A gun-type oil burner 19 may be mounted on and have its barrel 20 extended through the mostly removable front wall section 21 of base 16. The interior of the furnace is, furthermore, accessible by a door 22.

Arranged in the interior of the base and supported by floor 17 is a sheet metal combustion chamber 23 into which the end of the burner barrel or tube 20 extends. The space between the combustion chamber 23 and the furnace base 16 is filled with insulating material 24, preferably in the form of pellets, e. g., mica, which are loosely filled in. The arrangement of the insulating material with respect to the combustion chamber will be described in greater detail later.

The combustion chamber 23 has a double-walled, generally tubular upright portion composed of sectors, sections or units 25, 26. These units are each formed of an inner sheet metal wall 27 and an outer sheet metal wall 28. Along one of the vertical margins of each unit, the inner sheet 27 is bent back upon itself to form a double-thickness flange or extension 29 and is provided with a radially outwardly directed flange 30. The outer panel is secured by an outwardly directed flange 31 to the outer margin of flange 30, such as by electric spot welding. In Figures 1 through 10, flange 31 of the outer panel is extended to form an inwardly facing channel 32. Along the opposite vertical margin of each unit 25 or 26, the inner wall or sheet 27 is provided with a shallow offset 33 between the main portion of this panel and a radially outwardly directed marginal flange 34. The marginal portion 35 of flange 34 is secured, as by spot welding, to radially outwardly directed flange 36 of the outer wall or panel 28.

In the completed combustion chamber, the flange or extension 29 of each unit is received in the recess of the next unit and the channel 32 embraces the marginal flange portions 35, 36 thereby holding the units together. One or both of the flanges 30, 34, in the drawing the flange 34, are inclined so that the two flanges diverge from their outer margins toward the middle of the chamber so as to facilitate the joinder and relative adjustment of the units and so as to provide for the heat expansion. The arrangement of the flanges 29 and recesses 33 results in a substantially smooth surface, thereby avoiding flame impingement and consequent danger of zones of accelerated wear.

The inner walls 27 of the sections and their flanges end a short distance above the marginal portions 37 of the lower parts of the outer walls 28.

A bottom or end closure composed of sections or units 38, 39 is shaped to fit with little play into the space surrounded by said downwardly projecting portions 37 of the outer upright walls 28 and are supported on floor 17 by legs 40 so that their top surface is close to or engages the lower margin of the inner walls 27.

The two sections 38, 39 have a semi-annular flat outer portion 41, a marginal reinforcing flange 42, a dished-out central portion 43 and a flat transverse portion 44. The transverse margin of section 38 is downwardly offset at 45 and fits slidingly into a channel 46 formed by reverse bending along the transverse margin of section 39. The dishing-out of the sections 38, 39 increases their strength and prevents undue warping by heat expansion.

Wall section or unit 26 has an elongated opening 47 in its outer and inner walls, Figure 3. The size of this opening, especially its height, is greater than the greatest diameter of a burner barrel 20 expected to be used in combination with the new combustion chamber. Inserted between the outer and inner walls 27, 28 of section 26 is a slide 48 which is likewise in the form of a hollow structure having an inner wall 49 and an outer wall 50, Figures 3, 4 and 7. These walls are curved corresponding to the curvature of the walls 27, 28 of section 26 and are held in spaced relation by flanges 51 along the upright margins of the slide. Along one of the flanges 51 the walls 49 and 50 are interconnected, such as by spot welding at 52, while they are left without connection along the opposite margin so as to allow the walls to be spread from each other and fitted with pressure between the walls of sector 26.

An opening 53 extends through the walls of slide 48. The diameter of this opening is equal to the outer diameter of the burner barrel 20 to be used. It is self-evident that by the mere exchange of the slide or by providing it with an opening 53 of proper size, the combustion chamber may be adapted to different diameters of the burner barrel, and that the slide adjusts itself by its movability to different locations of the burner barrel above the level of floor 17.

The elongated, large size combustion chamber illustrated in Figure 10, comprises end wall sections 25 and 26 and half-circular floor sections 38, 39 which are identical with the correspondingly numbered sections of the embodiments per Figures 1 to 9. This chamber comprises, in addition, on each side two further wall sections or units 54 and a central floor section or unit 55. The wall sections 54 have less curvature than the sections 25 and 26. Apart from this, they are of the same general construction and, therefore, require no further description. The floor section 55 has a central dished-out area and it has parallel margins shaped, respectively, corresponding to the margins of sections 38 and 39 which they engage. The other two margins of section 55 are shaped in accordance with the curvature of the wall sections 54. It will be noted that the floor sections 38, 39 have the ends of their curved margins spaced from the adjoining portions of the outer walls of sections 54. However, this slight spacing is not objectionable, and it allows the use of the same floor sections 28, 29 of the first embodiment instead of an entire new set of sections accurately shaped in accordance with the curvature of wall units 54.

An elongated combustion chamber may also be arranged transversely to the axis of the burner, in which case the construction should be such that there is one wall section in the middle of one of the longer sides of the chamber.

The embodiment illustrated in Figures 11 and 12 differs from the construction of the preceding figures in that the channel 56 for holding the different wall sections 25, 26 together, is formed as an extension of inner wall flange 30 instead of the channel 32 formed as an extension of the outer panel 28, as shown in Figure 8. The embodiment according to Figure 11 is especially advantageous if the inner wall is made of heavier gauge or otherwise stronger material than the outer wall, as it results in a stronger joint between the units. This will mostly be the case because the inner wall has to be adapted to withstand the severe effect of the burner flame and the high temperatures.

One or both of walls 27 and 28, as shown in Figures 11 and 12, are provided with one or with several vertically spaced reinforcing means, such as beads 57, 58, respectively. For instance, one bead may be arranged near the top and another one near the bottom of the respective wall. The beads preferably project inwardly and outwardly, respectively, beyond the main surface of the walls and end shortly before the vertical margins of the sections so as not to interfere with the formation of the marginal flanges by which the walls and the sections are connected with each other. The direction in which the beads extend leaves the space between the inner and outer walls unobstructed so that they do not interfere with the insertion and movement of slide 48. The provision of reinforcing means allows reduction of the gauge of the walls which, in view of the high price of heat resistant metal, is important.

The new combustion chamber obviously can be easily installed in existing furnaces or in new, completely set up furnaces. The sections or units 25, 26, 38 and 39 as well as further units, such as 54 and 55, can be introduced singly into the interior of the furnace through one of the openings closed by wall portion 21 or door 22 and then put together by reaching through these openings. All but the last unit making up the upright tubular wall of the structure may simply be hooked together by their outer channels and flanges 35, 36 and 32 or 56. Only the last unit has to be slid into place. The assembly of the floor is so simple that it requires no further description. The tubular portion of the chamber is either assembled around the floor or bottom, or slid over it after having been assembled.

After complete assembly of the combustion chamber and after having slid burner barrel 20 through opening 47, the insulation 24 is filled in to, or better slightly higher than, the level of the upper margin of furnace base 16 which should about coincide with, or better be slightly lower than, the upper margin of the combustion chamber. The insulation is only filled into the space between the outer wall 28 of the combustion chamber but the space between the inner and outer walls 27, 28 is left free. This space is open at the top but closed at the bottom by the margins of floor sections 38, 39 and, if present, section 55.

The open space between the outer and inner walls permits heat emanating from the opposing surfaces of the both walls to radiate into the space above the combustion chamber which is surrounded by the water jacket. On the other hand, the shielding of the inner wall by the outer wall and its insulation assures that the inner wall, including the bottom wall, is speedily brought up to the desired temperature which is necessary for most efficient combustion and fuel economy dependent thereon. Upon starting of the burner, the inner wall very quickly attains the desired temperature throughout. In domestic oil burner furnaces, the temperature attained may be up to about 2400° F. and may bring the inner wall of the chamber to a yellow or bright red glow. Also, the outer wall will attain a similar temperature and color.

The connections between the walls and between the units are, in the illustrated embodiments, spaced from the inner wall and even arranged outside of the outer wall, i. e., remote from the hottest zones where they might deteriorate.

All parts and units entering into the new combustion chamber can be easily and economically manufactured and assembled with relatively simple tools and machines. The installation of the new chamber is likewise very simple and does not involve any cementing or brick work which would require skilled labor and a drying-out period.

The weight of the entire chamber is very small as compared with pre-formed chambers of ceramic material, and the units or sectors before their assembly take little room, so that the packing, shipping and storing costs are small.

For the combustion chambers illustrated in Figures 1 to 10, ample strength is achieved by making the inner walls and the floor sections of .03" material and the outer walls of .018" material. However, much lighter gauges may be employed, especially if the walls are reinforced such as by the beads 57, 58 shown in Figures 11 and 12, and if the material is highly resistant to the attack of the flame and of the combustion gases.

A large proportion of furnaces now used on the market may be equipped with circular combustion chambers having, respectively, an inner diameter of 13", 15" and 17" and a height of 14" and upward, the latter depending on the height of the furnace base.

The spacing between the two walls preferably may be between about 5/8" to 1" for all sizes of chambers; an efficient spacing is found to be about 3/4".

Certain wall and floor sections may be employed for different sizes and forms of combustion chambers as exemplified in Figures 1 to 9 and 10. However, to cover the range of furnace sizes and forms, a number of sets of units having different shapes and dimensions are desirable.

The invention is not restricted to the illustrated and described embodiments but is susceptible to modifications and adaptations which will easily occur to those skilled in the art without departing from the spirit of the invention. For example, changes may be designed for the means holding the outer and inner walls of the units together and for interconnecting the units with each other. Another example of a modification is the equipment of the outer wall of the chamber with a layer of insulating material on its inside, the outside or on both sides; indeed, the outer wall may consist of insulating material such as an asbestos plate. Such insulation of the outer wall may be in addition to or in place of the insulation between the furnace base and the combustion chamber. Though two walls are believed adequate, more than two radially spaced walls may be employed. Some further examples of modifications are mentioned in preceding parts of this specification.

What is claimed is:

1. A combustion chamber for gun-type burners, having a generally tubular inner sheet metal wall and an outer wall radially spaced from and surrounding said inner wall, said chamber comprising a plurality of units formed with registering sectors of the outer and inner walls, the wall sectors of the individual units being connected with each other along two opposite upright margins by radially extending webs, said units being provided with final assembly means permitting their easy connection with and disconnection from each other, and a bottom wall composed of at least two sections.

2. Combustion chamber for furnaces, including a tubular double-walled structure, which structure is composed of a plurality of sector units, each sector unit comprising an inner wall sector and an outer wall sector, said inner and outer wall sectors presenting individually made members of sheet material and being connected with each other in spaced relation, the spaces between the inner and outer wall sectors being in open communication with the surrounding air, and means releasably connecting the units with each other.

3. In a combustion chamber for furnaces in the form of a double-walled structure, the inner and outer walls being provided with registering openings of a size greater than the diameter of a burner barrel to be extended therethrough, and a slide between the walls having a smaller opening therethrough, the opening of said slide adapted to fit over a burner barrel, and the slide being at least vertically adjustable between the walls of the combustion chamber and closing the space between the margins of said openings in the walls and in said slide.

4. Combustion chamber according to claim 3, in which said slide is likewise a hollow double-walled body having registering openings extending through both of its walls.

5. A combustion chamber for furnaces with gun-type oil burner, composed of a plurality of removably interconnected sections, each of said sections having an outer wall and a radially spaced inner wall, said inner wall being radially outwardly flanged along its upright margins, said flanges forming connecting means between the inner wall and the outer wall and forming part of the means for connecting the sections with each other.

6. Combustion chamber for furnaces, having a generally tubular inner sheet metal wall and an outer wall radially spaced from said inner wall, said outer wall extending beyond said inner wall, and an end closure such as a bottom for the combustion chamber extending radially outwardly beyond the inner wall but ending short of the extended portion of the outer wall.

7. A wall section for the type of furnace combustion chamber which is composed of a plurality of removably interconnected wall sections, said section having an inner wall and a radially spaced outer wall, both said walls having radially outwardly directed flanges along their opposite margins, said flanges being overlappingly interconnected outside of the outer wall thereby locating the connection in regions which, when the section is installed in a furnace, are separated from the flame of a furnace burner by both said walls.

8. A wall section according to claim 7, having one of the flanges formed with a channel-section extension as part of means for connecting the section with a similar adjoining section.

9. A combustion chamber for domestic oil furnaces with gun-type oil burner, composed of a plurality of removably interconnected sections, each of said sections having an outer wall and a radially spaced inner wall provided along opposite marginal portions with connecting means between the inner and the outer walls and between adjoining sections, reinforcing beads formed at least in one of said outer and said inner walls, said beads extending between but ending short of said marginal portions.

References Cited in the file of this patent

UNITED STATES PATENTS

| Re. 20,866 | Peterson | Sept. 20, 1938 |
| 319,221 | Gallagher | June 2, 1885 |

(Other references on following page)

UNITED STATES PATENTS

| | | |
|---|---|---|
| 400,243 | Mills | Mar. 26, 1889 |
| 519,132 | Morgan | May 1, 1894 |
| 661,116 | Dannahower | Nov. 6, 1900 |
| 1,477,927 | Atterbury | Dec. 18, 1923 |
| 1,692,576 | Rote | Nov. 20, 1928 |
| 1,988,856 | Passino | Jan. 22, 1935 |
| 2,005,964 | Babcock | June 25, 1935 |
| 2,149,182 | Powers | Feb. 28, 1939 |
| 2,192,752 | Miller | Mar. 5, 1940 |
| 2,197,612 | Georg | Apr. 16, 1940 |
| 2,207,992 | Steele | July 16, 1940 |
| 2,244,314 | Powers | June 3, 1941 |
| 2,262,073 | Virden | Nov. 11, 1941 |
| 2,341,622 | Kaufman | Feb. 15, 1944 |
| 2,534,832 | Schinman | Dec. 19, 1950 |